United States Patent
Edwards

(10) Patent No.: US 9,760,740 B1
(45) Date of Patent: Sep. 12, 2017

(54) TERMINAL CASE WITH INTEGRATED DUAL READER STACK

(71) Applicant: Square, Inc., San Francisco, CA (US)

(72) Inventor: Troy Edwards, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 398 days.

(21) Appl. No.: 14/312,524

(22) Filed: Jun. 23, 2014

(51) Int. Cl.
*G06K 7/00* (2006.01)
*G06Q 20/20* (2012.01)

(52) U.S. Cl.
CPC ......... *G06K 7/0004* (2013.01); *G06Q 20/204* (2013.01)

(58) Field of Classification Search
None
See application file for complete search history.

(56) References Cited

U.S. PATENT DOCUMENTS

| | | |
|---|---|---|
| 3,854,036 A | 12/1974 | Gupta |
| 4,035,614 A | 7/1977 | Frattarola et al. |
| 4,254,441 A | 3/1981 | Fisher |
| 4,591,937 A | 5/1986 | Nakarai et al. |
| 4,609,957 A | 9/1986 | Gentet et al. |
| 4,727,544 A | 2/1988 | Brunner et al. |
| 4,788,420 A | 11/1988 | Chang et al. |
| 4,845,740 A | 7/1989 | Tokuyama et al. |
| 5,173,597 A | 12/1992 | Anglin |
| 5,266,789 A | 11/1993 | Anglin et al. |
| 5,406,627 A | 4/1995 | Thompson et al. |
| 5,434,395 A | 7/1995 | Storck et al. |
| 5,434,400 A | 7/1995 | Scherzer |
| 5,463,678 A | 10/1995 | Kepley, III et al. |
| 5,589,855 A | 12/1996 | Blumstein et al. |
| 5,603,078 A | 2/1997 | Henderson et al. |
| 5,616,904 A | 4/1997 | Fernadez |
| 5,679,943 A | 10/1997 | Schultz et al. |
| 5,729,591 A | 3/1998 | Bailey |

(Continued)

FOREIGN PATENT DOCUMENTS

| | | |
|---|---|---|
| CA | 2 812 251 A1 | 4/2012 |
| CA | 2 932 849 A1 | 6/2015 |

(Continued)

OTHER PUBLICATIONS

"What is a Coupling Capacitor," Retrieved from the Internet URL: http://www.learningaboutelectronics.com/Articles/What-is-a-coupling-capacitor, on Mar. 21, 2016, pp. 1-4.

(Continued)

*Primary Examiner* — Paul Danneman
(74) *Attorney, Agent, or Firm* — Polsinelli PC

(57) ABSTRACT

Aspects of the technology provide a multi-purpose card reader configured for use with a mobile electronic device (e.g., a mobile host), such as a smart phone or tablet computer. In certain aspects, the card reader is integrated into a case for enclosing the mobile electronic device and configured for reading financial information from a payment card to facilitate a financial transaction between a buyer and a merchant. To facilitate operability of the card reader, the case can include multiple card slots, such as a swipe-slot (e.g., for receiving a magnetic stripe payment card), and a dip-slot (e.g., for use in receiving an IC type payment card).

23 Claims, 6 Drawing Sheets

(56) References Cited

U.S. PATENT DOCUMENTS

| | | | |
|---|---|---|---|
| 5,763,862 A * | 6/1998 | Jachimowicz | G06K 7/0013 235/380 |
| 5,764,742 A | 6/1998 | Howard et al. | |
| 5,850,599 A | 12/1998 | Seiderman | |
| 5,878,337 A | 3/1999 | Joao et al. | |
| 5,907,801 A | 5/1999 | Albert et al. | |
| 5,945,654 A * | 8/1999 | Huang | G06K 7/084 235/449 |
| 5,991,410 A | 11/1999 | Albert et al. | |
| 5,991,749 A | 11/1999 | Morrill, Jr. | |
| D417,442 S | 12/1999 | Butts et al. | |
| 6,006,109 A | 12/1999 | Shin | |
| 6,010,067 A | 1/2000 | Elbaum | |
| 6,021,944 A | 2/2000 | Arakaki | |
| 6,032,859 A | 3/2000 | Hughes et al. | |
| 6,061,666 A | 5/2000 | Do et al. | |
| 6,095,410 A | 8/2000 | Andersen et al. | |
| 6,129,277 A | 10/2000 | Grant et al. | |
| 6,234,389 B1 | 5/2001 | Valliani et al. | |
| 6,308,227 B1 | 10/2001 | Kumar et al. | |
| 6,363,139 B1 | 3/2002 | Zurek et al. | |
| 6,400,517 B1 | 6/2002 | Murao | |
| 6,431,445 B1 | 8/2002 | Deland et al. | |
| 6,476,743 B1 | 11/2002 | Brown et al. | |
| 6,481,623 B1 | 11/2002 | Grant et al. | |
| 6,497,368 B1 | 12/2002 | Friend et al. | |
| 6,536,670 B1 | 3/2003 | Postman et al. | |
| D477,321 S | 7/2003 | Baughman | |
| 6,612,488 B2 | 9/2003 | Suzuki | |
| 6,813,608 B1 | 11/2004 | Baranowski | |
| 6,832,721 B2 | 12/2004 | Fujii | |
| 6,850,147 B2 | 2/2005 | Prokoski et al. | |
| 6,868,391 B1 | 3/2005 | Hultgren | |
| 6,896,182 B2 | 5/2005 | Sakaguchi | |
| 6,944,782 B2 | 9/2005 | von Mueller et al. | |
| 6,979,231 B2 | 12/2005 | Shinohara | |
| 7,003,316 B1 | 2/2006 | Elias et al. | |
| 7,013,149 B2 | 3/2006 | Vetro et al. | |
| 7,149,296 B2 | 12/2006 | Brown et al. | |
| 7,167,711 B1 | 1/2007 | Dennis | |
| 7,252,232 B2 | 8/2007 | Fernandes et al. | |
| 7,309,012 B2 | 12/2007 | Von Mueller et al. | |
| 7,324,836 B2 | 1/2008 | Steenstra et al. | |
| 7,363,054 B2 | 4/2008 | Elias et al. | |
| D575,056 S | 8/2008 | Tan | |
| 7,409,234 B2 | 8/2008 | Glezerman | |
| 7,424,732 B2 | 9/2008 | Matsumoto et al. | |
| 7,433,452 B2 | 10/2008 | Taylor et al. | |
| 7,505,762 B2 | 3/2009 | Onyon et al. | |
| 7,506,812 B2 | 3/2009 | von Mueller et al. | |
| D590,828 S | 4/2009 | Sherrod et al. | |
| 7,520,430 B1 | 4/2009 | Stewart et al. | |
| 7,581,678 B2 | 9/2009 | Narendra et al. | |
| 7,600,673 B2 | 10/2009 | Stoutenburg et al. | |
| D607,000 S | 12/2009 | Cheng et al. | |
| 7,668,308 B1 | 2/2010 | Wurtz | |
| 7,703,676 B2 | 4/2010 | Hart et al. | |
| 7,708,189 B1 | 5/2010 | Cipriano | |
| 7,757,953 B2 | 7/2010 | Hart et al. | |
| 7,793,834 B2 | 9/2010 | Hachey et al. | |
| 7,810,729 B2 * | 10/2010 | Morley, Jr. | G06K 7/083 235/435 |
| 7,869,591 B1 | 1/2011 | Nagel et al. | |
| 7,945,494 B2 | 5/2011 | Williams | |
| 8,011,587 B2 | 9/2011 | Johnson et al. | |
| 8,015,070 B2 | 9/2011 | Sinha et al. | |
| D646,264 S | 10/2011 | Dong | |
| D653,664 S | 2/2012 | Turnbull et al. | |
| 8,132,670 B1 | 3/2012 | Chen | |
| 8,231,055 B2 | 7/2012 | Wen | |
| 8,297,507 B2 | 10/2012 | Kayani | |
| 8,302,860 B2 | 11/2012 | McKelvey | |
| 8,336,771 B2 | 12/2012 | Tsai et al. | |
| D675,618 S | 2/2013 | Behar et al. | |
| 8,376,239 B1 | 2/2013 | Humphrey | |
| D677,667 S | 3/2013 | Smith et al. | |
| D679,714 S | 4/2013 | Smith et al. | |
| D680,537 S | 4/2013 | Miller et al. | |
| 8,413,901 B2 | 4/2013 | Wen | |
| 8,452,004 B2 | 5/2013 | Lee | |
| D686,208 S | 7/2013 | Miller et al. | |
| 8,500,010 B1 | 8/2013 | Marcus et al. | |
| 8,500,018 B2 | 8/2013 | McKelvey et al. | |
| 8,560,823 B1 | 10/2013 | Aytek et al. | |
| 8,571,989 B2 | 10/2013 | Dorsey et al. | |
| 8,573,486 B2 | 11/2013 | McKelvey et al. | |
| 8,573,487 B2 | 11/2013 | McKelvey | |
| 8,573,489 B2 | 11/2013 | Dorsey et al. | |
| 8,584,946 B2 | 11/2013 | Morley, Jr. | |
| 8,584,956 B2 | 11/2013 | Wilson et al. | |
| 8,602,305 B2 | 12/2013 | Dorsey et al. | |
| 8,612,352 B2 | 12/2013 | Dorsey et al. | |
| 8,615,445 B2 | 12/2013 | Dorsey et al. | |
| 8,640,953 B2 | 2/2014 | Dorsey et al. | |
| D700,606 S | 3/2014 | Lo | |
| 8,662,389 B2 | 3/2014 | Dorsey et al. | |
| 8,678,277 B2 | 3/2014 | Dorsey et al. | |
| D703,211 S | 4/2014 | Weller et al. | |
| 8,701,996 B2 | 4/2014 | Dorsey et al. | |
| 8,701,997 B2 | 4/2014 | Dorsey et al. | |
| D706,266 S | 6/2014 | Rotsaert | |
| 8,740,072 B1 | 6/2014 | Dorogusker | |
| 8,763,900 B2 | 7/2014 | Marcus et al. | |
| D711,876 S | 8/2014 | McWilliam et al. | |
| 8,794,517 B1 | 8/2014 | Templeton et al. | |
| D712,892 S | 9/2014 | Hong et al. | |
| 8,820,650 B2 | 9/2014 | Wilson et al. | |
| 8,840,017 B2 | 9/2014 | Chan et al. | |
| 8,840,024 B2 | 9/2014 | McKelvey et al. | |
| 8,870,070 B2 | 10/2014 | McKelvey et al. | |
| 8,870,071 B2 | 10/2014 | McKelvey | |
| 8,876,003 B2 | 11/2014 | McKelvey | |
| 8,910,868 B1 | 12/2014 | Wade et al. | |
| 8,931,699 B1 | 1/2015 | Wade et al. | |
| D724,094 S | 3/2015 | Blochinger et al. | |
| D725,655 S | 3/2015 | Debaigue et al. | |
| 8,967,465 B1 | 3/2015 | Wade et al. | |
| D726,171 S | 4/2015 | Edwards | |
| 9,016,570 B1 | 4/2015 | Gluck | |
| 9,016,572 B2 | 4/2015 | Babu et al. | |
| D728,549 S | 5/2015 | Su et al. | |
| D728,568 S | 5/2015 | Debaigue et al. | |
| D731,493 S | 6/2015 | Mills | |
| 9,063,737 B2 | 6/2015 | Babu et al. | |
| D740,820 S | 10/2015 | Templeton et al. | |
| 9,218,517 B2 | 12/2015 | Morley, Jr. | |
| 9,237,401 B2 | 1/2016 | Modi et al. | |
| 9,256,769 B1 | 2/2016 | Lamfalusi et al. | |
| 9,256,770 B1 | 2/2016 | Edwards | |
| 9,355,285 B1 | 5/2016 | Wade et al. | |
| D762,651 S | 8/2016 | Edwards et al. | |
| 2001/0001856 A1 | 5/2001 | Gould et al. | |
| 2002/0002507 A1 | 1/2002 | Hatakeyama | |
| 2002/0017568 A1 | 2/2002 | Grant et al. | |
| 2002/0030871 A1 | 3/2002 | Anderson et al. | |
| 2002/0073304 A1 | 6/2002 | Marsh et al. | |
| 2002/0077974 A1 | 6/2002 | Ortiz | |
| 2002/0099648 A1 | 7/2002 | DeVoe et al. | |
| 2002/0108062 A1 | 8/2002 | Nakajima et al. | |
| 2002/0165462 A1 | 11/2002 | Westbrook et al. | |
| 2002/0169541 A1 | 11/2002 | Bouve et al. | |
| 2002/0188535 A1 | 12/2002 | Chao et al. | |
| 2003/0089772 A1 | 5/2003 | Chien | |
| 2003/0132300 A1 | 7/2003 | Dilday et al. | |
| 2003/0135463 A1 | 7/2003 | Brown et al. | |
| 2003/0144040 A1 | 7/2003 | Liu et al. | |
| 2004/0011650 A1 | 1/2004 | Zenhausern et al. | |
| 2004/0012875 A1 | 1/2004 | Wood | |
| 2004/0033726 A1 | 2/2004 | Kao | |
| 2004/0041911 A1 | 3/2004 | Odagiri et al. | |
| 2004/0058705 A1 | 3/2004 | Morgan et al. | |
| 2004/0087339 A1 | 5/2004 | Goldthwaite et al. | |
| 2004/0093496 A1 | 5/2004 | Colnot | |
| 2004/0104268 A1 | 6/2004 | Bailey | |

(56) References Cited

U.S. PATENT DOCUMENTS

| | | |
|---|---|---|
| 2004/0127256 A1 | 7/2004 | Goldthwaite et al. |
| 2004/0128256 A1 | 7/2004 | Krouse et al. |
| 2004/0151026 A1 | 8/2004 | Naso et al. |
| 2004/0178326 A1 | 9/2004 | Hamilton et al. |
| 2004/0204074 A1 | 10/2004 | Desai |
| 2004/0204082 A1 | 10/2004 | Abeyta |
| 2004/0230489 A1 | 11/2004 | Goldthwaite et al. |
| 2004/0230526 A1 | 11/2004 | Praisner |
| 2005/0009004 A1 | 1/2005 | Xu et al. |
| 2005/0010702 A1 | 1/2005 | Saito et al. |
| 2005/0023348 A1* | 2/2005 | Lucas .............. G06K 7/0004 235/440 |
| 2005/0077870 A1 | 4/2005 | Ha et al. |
| 2005/0156037 A1 | 7/2005 | Wurzburg |
| 2005/0156038 A1 | 7/2005 | Wurzburg |
| 2005/0164631 A1 | 7/2005 | Jin |
| 2005/0167496 A1 | 8/2005 | Morley, Jr. et al. |
| 2005/0194452 A1 | 9/2005 | Nordentoft et al. |
| 2005/0209719 A1 | 9/2005 | Beckert et al. |
| 2005/0219728 A1 | 10/2005 | Durbin et al. |
| 2005/0236480 A1 | 10/2005 | Vrotsos et al. |
| 2005/0242173 A1 | 11/2005 | Suzuki |
| 2005/0247787 A1 | 11/2005 | Von Mueller et al. |
| 2006/0000917 A1 | 1/2006 | Kim et al. |
| 2006/0049255 A1 | 3/2006 | Von Mueller et al. |
| 2006/0094481 A1 | 5/2006 | Gullickson |
| 2006/0122902 A1 | 6/2006 | Petrov et al. |
| 2006/0152276 A1 | 7/2006 | Barksdale |
| 2006/0208066 A1 | 9/2006 | Finn et al. |
| 2006/0219776 A1 | 10/2006 | Finn |
| 2006/0223580 A1 | 10/2006 | Antonio et al. |
| 2006/0234771 A1 | 10/2006 | Shavrov |
| 2006/0273158 A1 | 12/2006 | Suzuki |
| 2007/0063048 A1 | 3/2007 | Havens et al. |
| 2007/0067833 A1 | 3/2007 | Colnot |
| 2007/0100651 A1 | 5/2007 | Ramer et al. |
| 2007/0124211 A1 | 5/2007 | Smith |
| 2007/0155430 A1 | 7/2007 | Cheon et al. |
| 2007/0174080 A1 | 7/2007 | Outwater |
| 2007/0201492 A1 | 8/2007 | Kobayashi |
| 2007/0221728 A1 | 9/2007 | Ferro et al. |
| 2007/0244811 A1 | 10/2007 | Tumminaro |
| 2007/0250623 A1 | 10/2007 | Hickey et al. |
| 2007/0255620 A1 | 11/2007 | Tumminaro et al. |
| 2007/0255643 A1 | 11/2007 | Capuano et al. |
| 2007/0255653 A1 | 11/2007 | Tumminaro et al. |
| 2007/0287498 A1 | 12/2007 | Wang et al. |
| 2008/0011850 A1* | 1/2008 | Henry .............. G06K 7/0004 235/441 |
| 2008/0017712 A1 | 1/2008 | Hart et al. |
| 2008/0027815 A1 | 1/2008 | Johnson et al. |
| 2008/0040265 A1 | 2/2008 | Rackley, III et al. |
| 2008/0040274 A1 | 2/2008 | Uzo |
| 2008/0059370 A1 | 3/2008 | Sada et al. |
| 2008/0059375 A1 | 3/2008 | Abifaker |
| 2008/0103972 A1 | 5/2008 | Lane |
| 2008/0147564 A1 | 6/2008 | Singhal |
| 2008/0172306 A1 | 7/2008 | Schorr et al. |
| 2008/0177662 A1 | 7/2008 | Smith et al. |
| 2008/0208762 A1 | 8/2008 | Arthur et al. |
| 2008/0238610 A1 | 10/2008 | Rosenberg |
| 2008/0249939 A1 | 10/2008 | Veenstra |
| 2008/0275779 A1 | 11/2008 | Lakshminarayanan |
| 2008/0294766 A1 | 11/2008 | Wang et al. |
| 2009/0048978 A1 | 2/2009 | Ginter et al. |
| 2009/0068982 A1 | 3/2009 | Chen et al. |
| 2009/0098908 A1 | 4/2009 | Silverbrook et al. |
| 2009/0100168 A1 | 4/2009 | Harris |
| 2009/0104920 A1 | 4/2009 | Moon et al. |
| 2009/0117883 A1 | 5/2009 | Coffing et al. |
| 2009/0119190 A1 | 5/2009 | Realini |
| 2009/0125429 A1 | 5/2009 | Takayama |
| 2009/0144161 A1 | 6/2009 | Fisher |
| 2009/0159681 A1 | 6/2009 | Mullen et al. |
| 2009/0166422 A1 | 7/2009 | Biskupski |
| 2009/0180354 A1 | 7/2009 | Sander et al. |
| 2009/0187492 A1 | 7/2009 | Hammad et al. |
| 2010/0063893 A1 | 3/2010 | Townsend |
| 2010/0108762 A1 | 5/2010 | Morley, Jr. |
| 2010/0127857 A1 | 5/2010 | Kilmurray et al. |
| 2010/0128900 A1 | 5/2010 | Johnson |
| 2010/0184479 A1 | 7/2010 | Griffin, Jr. |
| 2010/0222000 A1 | 9/2010 | Sauer et al. |
| 2010/0241838 A1 | 9/2010 | Cohen et al. |
| 2010/0243732 A1 | 9/2010 | Wallner |
| 2010/0260341 A1 | 10/2010 | Sander et al. |
| 2010/0289390 A1 | 11/2010 | Kenney |
| 2010/0314446 A1 | 12/2010 | Morley, Jr. |
| 2011/0033910 A1 | 2/2011 | Yamanaka et al. |
| 2011/0053560 A1 | 3/2011 | Jain et al. |
| 2011/0062235 A1 | 3/2011 | Morley, Jr. |
| 2011/0084131 A1 | 4/2011 | McKelvey |
| 2011/0084139 A1 | 4/2011 | McKelvey et al. |
| 2011/0084140 A1 | 4/2011 | Wen |
| 2011/0137803 A1 | 6/2011 | Willins |
| 2011/0161235 A1 | 6/2011 | Beenau et al. |
| 2011/0165896 A1 | 7/2011 | Stromberg et al. |
| 2011/0174879 A1 | 7/2011 | Morley, Jr. |
| 2011/0180601 A1 | 7/2011 | Morley, Jr. |
| 2011/0191196 A1 | 8/2011 | Orr et al. |
| 2011/0198395 A1 | 8/2011 | Chen |
| 2011/0202463 A1 | 8/2011 | Powell |
| 2011/0258120 A1 | 10/2011 | Weiss |
| 2011/0313880 A1 | 12/2011 | Paul et al. |
| 2012/0008851 A1 | 1/2012 | Pennock et al. |
| 2012/0011024 A1 | 1/2012 | Dorsey et al. |
| 2012/0011071 A1 | 1/2012 | Pennock et al. |
| 2012/0012653 A1 | 1/2012 | Johnson et al. |
| 2012/0016794 A1 | 1/2012 | Orr et al. |
| 2012/0026018 A1 | 2/2012 | Lin |
| 2012/0052910 A1 | 3/2012 | Mu et al. |
| 2012/0095869 A1 | 4/2012 | McKelvey |
| 2012/0095870 A1 | 4/2012 | McKelvey |
| 2012/0097739 A1 | 4/2012 | Babu et al. |
| 2012/0097740 A1 | 4/2012 | Lamba et al. |
| 2012/0118956 A1 | 5/2012 | Lamba |
| 2012/0118959 A1 | 5/2012 | Sather et al. |
| 2012/0118960 A1 | 5/2012 | Sather et al. |
| 2012/0126005 A1 | 5/2012 | Dorsey et al. |
| 2012/0126006 A1 | 5/2012 | Dorsey et al. |
| 2012/0126007 A1 | 5/2012 | Lamba |
| 2012/0126010 A1 | 5/2012 | Babu et al. |
| 2012/0126011 A1 | 5/2012 | Lamba et al. |
| 2012/0126012 A1 | 5/2012 | Lamba et al. |
| 2012/0126013 A1 | 5/2012 | Sather et al. |
| 2012/0126014 A1 | 5/2012 | Sather et al. |
| 2012/0130903 A1 | 5/2012 | Dorsey et al. |
| 2012/0132712 A1 | 5/2012 | Babu et al. |
| 2012/0138683 A1 | 6/2012 | Sather et al. |
| 2012/0154561 A1 | 6/2012 | Chari |
| 2012/0168505 A1 | 7/2012 | Sather et al. |
| 2012/0234918 A1 | 9/2012 | Lindsay |
| 2012/0246074 A1 | 9/2012 | Annamalai et al. |
| 2012/0259651 A1 | 10/2012 | Mallon et al. |
| 2012/0270528 A1 | 10/2012 | Goodman |
| 2013/0021046 A1 | 1/2013 | Prentice et al. |
| 2013/0031003 A1 | 1/2013 | Dorsey et al. |
| 2013/0031004 A1 | 1/2013 | Dorsey et al. |
| 2013/0087614 A1 | 4/2013 | Limtao et al. |
| 2013/0137367 A1 | 5/2013 | Fisher |
| 2013/0200147 A1 | 8/2013 | Dorsey et al. |
| 2013/0200148 A1 | 8/2013 | Dorsey et al. |
| 2013/0200149 A1 | 8/2013 | Dorsey et al. |
| 2013/0200153 A1 | 8/2013 | Dorsey et al. |
| 2013/0200154 A1 | 8/2013 | Dorsey et al. |
| 2013/0204788 A1 | 8/2013 | Dorsey et al. |
| 2013/0204791 A1 | 8/2013 | Dorsey et al. |
| 2013/0204792 A1 | 8/2013 | Dorsey et al. |
| 2013/0207481 A1 | 8/2013 | Gobburu et al. |
| 2013/0254117 A1 | 9/2013 | von Mueller et al. |
| 2013/0254118 A1 | 9/2013 | Dorsey et al. |
| 2013/0290762 A1 | 10/2013 | Pawar |
| 2013/0299575 A1 | 11/2013 | McKelvey et al. |
| 2013/0304244 A1 | 11/2013 | Ojanper |

(56) References Cited

U.S. PATENT DOCUMENTS

| | | | |
|---|---|---|---|
| 2013/0320089 A1 | 12/2013 | Marcus et al. |
| 2014/0001257 A1 | 1/2014 | Dorsey et al. |
| 2014/0001263 A1 | 1/2014 | Babu et al. |
| 2014/0017955 A1 | 1/2014 | Lo et al. |
| 2014/0018016 A1 | 1/2014 | Chang et al. |
| 2014/0061301 A1 | 3/2014 | Cho et al. |
| 2014/0076964 A1 | 3/2014 | Morley, Jr. |
| 2014/0089205 A1 | 3/2014 | Kapur et al. |
| 2014/0097242 A1 | 4/2014 | McKelvey |
| 2014/0124576 A1 | 5/2014 | Zhou |
| 2014/0131442 A1 | 5/2014 | Morrow et al. |
| 2014/0144983 A1 | 5/2014 | Dorsey et al. |
| 2014/0203082 A1 | 7/2014 | Huh |
| 2014/0258132 A1 | 9/2014 | Swamy et al. |
| 2014/0265642 A1 | 9/2014 | Utley et al. |
| 2014/0295761 A1 | 10/2014 | Lo |
| 2014/0297539 A1 | 10/2014 | Swamy et al. |
| 2015/0078560 A1 | 3/2015 | Ilango et al. |
| 2015/0149992 A1 | 5/2015 | Wade et al. |
| 2015/0161419 A1 | 6/2015 | Wade et al. |
| 2015/0199677 A1 | 7/2015 | Wade et al. |
| 2016/0055478 A1 | 2/2016 | Skoog |
| 2016/0070940 A1 | 3/2016 | Lamba et al. |
| 2016/0132703 A1 | 5/2016 | Lamfalusi et al. |
| 2016/0188915 A1 | 6/2016 | Babu et al. |
| 2016/0203466 A1 | 7/2016 | Lamba et al. |
| 2016/0203667 A1 | 7/2016 | Lamba et al. |
| 2016/0239691 A1 | 8/2016 | Wade et al. |

FOREIGN PATENT DOCUMENTS

| | | | |
|---|---|---|---|
| CA | 2 920 589 A1 | 8/2016 |
| CN | 302341093 S | 3/2013 |
| CN | 302526592 S | 8/2013 |
| EP | 1 145 766 A2 | 10/2001 |
| EP | 2 693 298 A2 | 2/2014 |
| EP | 3 091 474 A1 | 11/2016 |
| HK | 1211124 A1 | 5/2016 |
| JP | 2003-108777 A | 4/2003 |
| JP | 2004-078662 A | 3/2004 |
| JP | 2005-063869 A | 3/2005 |
| JP | 2005-242550 A | 9/2005 |
| JP | 2005-269172 A | 9/2005 |
| JP | 2009-199649 A | 9/2009 |
| JP | 2001-313714 A | 11/2011 |
| JP | 2013-518344 A | 5/2013 |
| KR | 10-0452161 B1 | 10/2004 |
| KR | 10-2005-0077659 A | 8/2005 |
| KR | 10-2008-0039330 A | 5/2008 |
| WO | 01/65827 A2 | 9/2001 |
| WO | 02/084548 A1 | 10/2002 |
| WO | 2007/070592 A2 | 6/2007 |
| WO | 2009/128483 A1 | 10/2009 |
| WO | 2010/097711 A2 | 9/2010 |
| WO | 2010/111130 | 9/2010 |
| WO | 2010/135174 A1 | 11/2010 |
| WO | 2011/047028 A2 | 4/2011 |
| WO | 2011/047030 A2 | 4/2011 |
| WO | 2012/051070 A2 | 4/2012 |
| WO | 2013/009891 A1 | 1/2013 |
| WO | 2013/074499 A1 | 5/2013 |
| WO | 2015/081002 A1 | 6/2015 |
| WO | 2015/089301 A1 | 6/2015 |
| WO | 2016/028823 A1 | 2/2016 |

OTHER PUBLICATIONS

Examiner's Report for Canadian Industrial Design Application No. 159528, mailed on Dec. 1, 2015.
Notice of Allowance mailed Jan. 29, 2016, for U.S. Appl. No. 13/298,501, of Babu, A., et al., filed Nov. 17, 2011.
Notice of Allowance mailed Jan. 29, 2016, for U.S. Appl. No. 13/298,534, of Lamba, K., et al., filed Nov. 17, 2011.
Final Office Action mailed Feb. 1, 2016, for U.S. Appl. No. 13/298,560, of Lamba, K., et al., filed Nov. 17, 2011.
Notice of Allowance mailed Feb. 5, 2016, for U.S. Appl. No. 14/620,699, of Wade, J., et al., filed Feb. 12, 2015.
Non-Final Office Action mailed Feb. 25, 2016, for U.S. Appl. No. 14/979,407, of Lamfalusi, M., et al., filed Dec. 27, 2015.
Examiner Requisition for Canadian Application No. 2,812,594, mailed on Feb. 26, 2016.
Non-Final Office Action mailed Mar. 1, 2016, for U.S. Appl. No. 14/942,515, of Lamba, K., et al., filed Nov. 16, 2015.
Notice of Allowance mailed Mar. 28, 2016, for Design U.S. Appl. No. 29/493,212, of Edwards, T., et al., filed Jun. 6, 2014.
Non-Final Office Action mailed Apr. 7, 2016, for U.S. Appl. No. 13/298,506, of Lamba, K., et al., filed Nov. 17, 2011.
Advisory Action mailed Apr. 14, 2016, for U.S. Appl. No. 13/298,560, of Lamba, K., et al., filed Nov. 17, 2011.
Non-Final Office Action mailed May 5, 2016, for U.S. Appl. No. 14/306,041, of Wade, J., et al., filed Jun. 16, 2014.
Non-Final Office Action mailed May 6, 2016, for U.S. Appl. No. 14/512,104, of Templeton, T., et al., filed Oct. 10, 2014.
Notice of Allowance mailed May 10, 2016, for U.S. Appl. No. 14/942,515, of Lamba, K., et al., filed Nov. 16, 2015.
Non-Final Office Action mailed May 19, 2016, for U.S. Appl. No. 13/298,560, of Lamba, K., et al., filed Nov. 17, 2011.
Office Action for Canadian Patent Application No. 2,920,589, mailed Mar. 11, 2016.
Office Action for European Patent Application No. 11 833 172.7, mailed May 17, 2016.
Notice of Allowance mailed Jun. 3, 2016, for U.S. Appl. No. 14/942,515, of Lamba, K., et al., filed Nov. 16, 2015.
Notice of Allowance mailed Jun. 13, 2016, for U.S. Appl. No. 14/979,407, of Lamfalusi, M., et al., filed Dec. 27, 2015.
Notice of Allowance mailed Jun. 14, 2016, for U.S. Appl. No. 14/942,515, of Lamba, K., et al., filed Nov. 16, 2015.
Non-Final Office Action mailed Nov. 21, 2013, for U.S. Appl. No. 14/052,009, of Wilson, M., et al., filed Oct. 11, 2013.
Non-Final Office Action mailed Jul. 19, 2012, for U.S. Appl. No. 12/903,758, of Wilson, M., et al., filed Oct. 13, 2010.
"Reading magnetic cards (almost) for free," Lekernel's Scrapbook, ("Lekernel"), Jan. 26, 2009, Retrieved from the Internet URL: http://lekernel.net/blog/?p=12, on May 5, 2011, pp. 1-2.
"MSR500EX (Mini123EX) Portable Magnetic Stripe Card Reader," TYNER, Apr. 27, 2007, Retrieved from the Internet URL: http://www.tyner.com/magnetic/msr500ex.htm, on Apr. 22, 2011, pp. 1-3.
Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.
Padilla, L., "Magnetic stripe reader circuit," Jan. 28, 1997, Retrieved from the Internet URL: http://www.gae.ucm.es/~padilla/extraworkImagamp.html, on May 5, 2011, pp. 1-7.
Padilla, L. "The simplest magnetic stripe reader," Jan. 27, 2003, Retrieved from the Internet URL: www.gae.ucm.esi~padilla/extrawork/soundtrack.html, on Dec. 21, 2009, pp. 1-5.
"Travel industry targeted for Palm PDA card reader," Retrieved from the Internet URL: http://www.m-travel.com/news/2001/08/travel_industry.html, on Apr. 19, 2011, pp. 1-2.
"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.
"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.
"Credit Card Swiper and Reader for iPhone, iPad," Blackberry, Android and more, Retrieved from the Internet URL: http://hubpages.com/hub/Credit-Card-Swiper-and-Reader-for-iPhone-iPad-Blackberry-An . . . , on Apr. 20, 2011, pp. 1-2.
Titlow, J.P., "ROAM pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.

(56) References Cited

OTHER PUBLICATIONS

Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.
Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.
"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.
"Mophie Marketplace Magnetic Strip Reader/Case for iPhone 3G & 3GS-Grey," J&R (JR.com), Retrieved from the Internet URL: http://www.jr.com/mophie/pe/MPE_MPIP3GBLK, on Feb. 8, 2011, pp. 1-1.
"Barcode scanner and Magnetic Stripe Reader (MSR) for Pocke . . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.
"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-credit-cards- . . . , on Feb. 8, 2011, pp. 1-3.
Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.
"Arduino magnetic stripe decoder," Instructables, Retrieved from the Internet URL: http://www.instructables.com/id/Arduino-magneticstripe-decorder/, on Feb. 8, 2011, pp. 1-5.
"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.
"Pay@PC," Retrieved from the Internet URL: http://www.merchantanywhere.com/PAY_AT_PCT@PC.htm, on Feb. 11, 2011, pp. 1-2.
"Get paid on the spot from your mobile phone," Retrieved from the Internet URL: http://payments.intuit.com/products/basic-payment-solutions/mobile-credit-card-processin . . . , on Feb. 11, 2011, pp. 1-3.
"Touch-Pay Wireless Credit Card Processing," MerchantSeek, Retrieved from the Internet URL: http://www.merchantseek.com/wireless-credit-card-processing.htm, on Feb. 11, 2011, pp. 1-5.
"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-sid . . . , on Apr. 19, 2011, pp. 1-2.
Grandison, K., "vTerminal Credit Card Processing App for AuthorizeNet and PayPal Payflow Pro for Curve 8350 8500 8900 and Bold 9000," Retrieved from the Internet URL: http://www.4blackberry.net/tag/business-tools/vterminal-credit-card-processing-app-for-authorizenet-and-paypal-payflow-pro-for-curve-8350-8500-890-download-2075.html, on Mar. 30, 2015, pp. 1-4.
Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.
"Headphone Jack (3.5mm)," Retrieved from the Internet URL: http://www.phonescoop.com/glossary/term.php?gid=440, on May 5, 2011, pp. 1-1.
"2.5mm Headset Jack," Retrieved from the Internet URL: http://www.phonescoop.com/glossary/term.php?gid=360, on May 5, 2011, pp. 1-1.
"Reference Designations for Electrical and Electronics Parts and Equipment," Engineering Drawing and Related Documentation Practices, ASME Y14.44/2008, The American Society of Mechanical Engineers, Nov. 21, 2008, pp. 1-31.
Acidus, "Mag-stripe Interfacing—A Lost Art," Retrieved from the Internet URL: http://www.scribd.com/doc/18236182/Magstripe-Interfacing#open_. . . , on Feb. 7, 2011, pp. 1-4.
"Mag-stripe readers The hunt for a homebrew mag-stripe reader that'll work with modern," Jan. 16, 2009, Retrieved from the Internet URL: http://www.hak5.org/forums/index.php?showtopic=11563&st=20, on Apr. 25, 2011, pp. 1-6.
Kuo, Y-S et al., "Hijacking Power and Bandwidth from the Mobile Phone's Audio Interface," Proceedings of the First ACM Symposium on Computing for Development, (DEV'10), Dec. 17, 2010, pp. 1-10.
Website: www.alexwinston.com, Aug. 31, 2009, pp. 1-5.
"Magnetic Card Reader," lekernel.net~scrapbook, Retrieved from the Internet URL: http://lekernel.net/scrapbook/old/cardreader.html, on Apr. 25, 2011, pp. 1-4.
"Magnetic stripe reader/writer," Retrieved from the Internet URL: http://www.gae.ucm.es/-padilla/extrawork/stripe.html, on Dec. 21, 2009, pp. 1-2.
Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.
Bauer, G.R. et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.
European Search Report and Opinion for European Patent Application No. 11 786 731.7, mailed Mar. 28, 2014.
Office Action for European Patent Application No. 11 786 731.7, mailed Jul. 16, 2015.
Non-Final Office Action mailed Sep. 30, 2011, for U.S. Appl. No. 12/903,753, of McKelvey, J., et al., filed Oct. 13, 2010.
Final Office Action mailed Jul. 6, 2012, for U.S. Appl. No. 12/903,753, of McKelvey, J., et al., filed Oct. 13, 2010.
Non-Final Office Action mailed Jul. 8, 2013, for U.S. Appl. No. 12/903,753, of McKelvey, J., et al., filed Oct. 13, 2010.
Notice of Allowance mailed Oct. 10, 2013, for U.S. Appl. No. 12/903,753, of Mckelvey, J., filed Oct. 13, 2010.
Final Office Action mailed Apr. 24, 2013, for U.S. Appl. No. 12/903,758, of Wilson, M., et al., filed Oct. 13, 2010.
Notice of Allowance mailed Aug. 6, 2013, for U.S. Appl. No. 12/903,758, of Wilson, M., et al., filed Oct. 13, 2010.
Notice of Allowance mailed Apr. 4, 2014, for U.S. Appl. No. 14/052,009, of Wilson, M., et al., filed Oct. 11, 2013.
Notice of Allowance mailed Jul. 30, 2014, for U.S. Appl. No. 14/052,009, of Wilson, M., et al., filed Oct. 11, 2013.
Non-Final Office Action mailed Sep. 30, 2011, for U.S. Appl. No. 13/010,976, of Babu, A. R., et al., filed Jan. 21, 2011.
Final Office Action mailed Jun. 12, 2012, for U.S. Appl. No. 13/010,976, of Babu, A. R., et al., filed Jan. 21, 2011.
Advisory Action mailed Aug. 24, 2012, for U.S. Appl. No. 13/010,976, of Babu, A. R., et al., filed Jan. 21, 2011.
Non-Final Office Action mailed Aug. 15, 2014, for U.S. Appl. No. 13/010,976, of Babu, A. R., et al., filed Jan. 21, 2011.
Notice of Allowance mailed Dec. 24, 2014, for U.S. Appl. No. 13/010,976, of Babu, A. R., et al., filed Jan. 21, 2011.
Non-Final Office Action mailed Apr. 2, 2014, for U.S. Appl. No. 14/012,655, of McKelvey, J., filed Aug. 28, 2013.
Final Office Action mailed Aug. 15, 2014, for U.S. Appl. No. 14/012,655, of McKelvey, J., filed Aug. 28, 2013.
Non-Final Office Action mailed Jan. 20, 2015, for U.S. Appl. No. 14/012,655, of McKelvey, J., filed Aug. 28, 2013.
Notice of Allowance mailed Sep. 1, 2015, for U.S. Appl. No. 13/298,487, of Babu, A., et al., filed Nov. 17, 2011.
Non-Final Office Action mailed Apr. 29, 2013, for U.S. Appl. No. 13/298,487, of Babu, A., et al., filed Nov. 17, 2011.
Final Office Action mailed Aug. 22, 2013, for U.S. Appl. No. 13/298,487, of Babu, A., et al., filed Nov. 17, 2011.
Advisory Action mailed Oct. 22, 2013, for U.S. Appl. No. 13/298,487, of Babu, A., et al., filed Nov. 17, 2011.

(56) References Cited

OTHER PUBLICATIONS

Non-Final Office Action mailed Aug. 21, 2014, for U.S. Appl. No. 13/298,487, of Babu, A., et al., filed Nov. 17, 2011.
Final Office Action mailed Mar. 18, 2015, for U.S. Appl. No. 13/298,487, of Babu, A., et al., filed Nov. 17, 2011.
Non-Final Office Action mailed Feb. 20, 2015, for U.S. Appl. No. 14/512,104, of Templeton, T., et al., filed Oct. 10, 2014.
International Search Report and Written Opinion for PCT Application No. PCT/US2010/052483, mailed Jun. 10, 2011.
International Search Report and Written Opinion for PCT Application No. PCT/US2011/055386, mailed Feb. 22, 2012.
European Search Report and Opinion for European Application No. 11833172.7, mailed Apr. 22, 2014.
International Search Report and Written Opinion for PCT Application No. PCT/US2014/069788, mailed May 14, 2015.
International Search Report and Written Opinion for PCT Application No. PCT/US2012/064782, mailed Feb. 26, 2013.
International Search Report and Written Opinion for PCT Application No. PCT/US2010/052481, mailed Jun. 23, 2011.
International Search Report and Written Opinion for PCT Application No. PCT/US2014/067074, mailed Mar. 15, 2015.
Examination Report for Canadian Application No. 2,812,594, mailed on Feb. 24, 2015.
Examination Report No. 1 for Australian Application No. 201415781, mailed on Feb. 23, 2015 (Registration No. 359005).
"Review: Square, Inc. Square Credit Card Reader (2013)," iLounge, Retrieved from the Internet URL: http://www.ilounge.com/index.php/reviews/entry/square-inc.-square-credit-card-reader-2013/, on Jan. 16, 2014, pp. 3.
"TUAW The Unofficial Apple Weblog, Square credit card reader loses weight, gains accuracy", Retrieved from the Internet URL: http://www.tuaw.com/2013/12/09/square-credit-card--reader-loses-weight-gains-accuracy/, on Dec. 9, 2013, p. 1.
Examination Report No. 2 for Australian Application No. 201415781, mailed Aug. 13, 2015 (Registration No. 359005).
Ryan, P., "Plug and Pay: A Gallery of 26 Mobile Card Readers," Aug. 20, 2013, Retrieved from the Internet URL: http://bankinnovation.net/2013/08/plug-and-pay-a-gallery-of-26-mobile-card-readers/, on Feb. 19, 2015, pp. 1-12.
Notification of Registration of a Design for Australian Application No. 201415781, mailed on Nov. 27, 2014 (Registration No. 359005).
First Examination Report for Indian Design Application No. 267386, mailed Feb. 5, 2015.
Non-Final Office Action mailed Apr. 25, 2013, for U.S. Appl. No. 13/298,491, of Lamba, K., et al., filed Nov. 17, 2011.
Final Office Action mailed Sep. 17, 2013, for U.S. Appl. No. 13/298,491, of Lamba, K, et al., filed Nov. 17, 2011.
Advisory Action mailed Oct. 22, 2013, for U.S. Appl. No. 13/298,491, of Lamba, K., et al., filed Nov. 17, 2011.
Non-Final Office Action mailed Jul. 17, 2014, for U.S. Appl. No. 13/298,491, of Lamba, K., et al., filed Nov. 17, 2011.
Final Office Action mailed Feb. 4, 2015, for U.S. Appl. No. 13/298,491, of Lamba, K., et al., filed Nov. 17, 2011.
Notice of Allowance mailed Jun. 22, 2015, for U.S. Appl. No. 13/298,491, of Lamba, K., et al., filed Nov. 17, 2011.
Non-Final Office Action mailed Jun. 6, 2014, for U.S. Appl. No. 14/231,598, of Wade, J., et al., filed Mar. 31, 2014.
Non-Final Office Action mailed Apr. 10, 2015, for U.S. Appl. No. 14/189,997, of Lamfalusi, M., et al., filed Feb. 25, 2014.
Notice of Allowance mailed Nov. 25, 2014, for U.S. Appl. No. 14/231,598, of Claude, J.B., et al., filed Mar. 31, 2014.
Non-Final Office Action mailed Jun. 22, 2015, for U.S. Appl. No. 14/322,815, of Edwards, T., filed Jul. 2, 2014.
Notice of Allowance mailed Aug. 1, 2014, for U.S. Appl. No. 14/203,463, of Wade, J., et al., filed Mar. 10, 2014.
Notice of Allowance mailed Aug. 27, 2015, for U.S. Appl. No. 13/298,501, of Babu, A., et al., filed Nov. 17, 2011.
Non-Final Office Action mailed Sep. 11, 2014, for U.S. Appl. No. 13/298,501, of Babu, A., et al., filed Nov. 17, 2011.
Final Office Action mailed May 6, 2015, for U.S. Appl. No. 13/298,501, of Babu, A., et al., filed Nov. 17, 2011.
Notice of Allowance mailed Oct. 17, 2014, for U.S. Appl. No. 14/220,967, of Wade, J., et al., filed Mar. 20, 2014.
Notice of Allowance mailed Dec. 18, 2014, for U.S. Appl. No. 14/220,967, of Wade, J., et al., filed Mar. 20, 2014.
Notice of Allowance mailed May 19, 2015, for U.S. Appl. No. 14/620,765, of Wade, J., et al., filed Feb. 12, 2015.
Non-Final Office Action mailed May 26, 2015, for U.S. Appl. No. 14/551,681, of Wade, J., et al., filed Nov. 24, 2014.
Notice of Allowance mailed Jun. 10, 2014, for U.S. Appl. No. 29/491,147, of Templeton T., et al., filed May 16, 2014.
Non-Final Office Action mailed Sep. 11, 2014, for U.S. Appl. No. 13/298,506, of Lamba, K., et al., filed Nov. 17, 2011.
Final Office Action mailed May 6, 2015, for U.S. Appl. No. 13/298,506, of Lamba, K., et al., filed Nov. 17, 2011.
Non-Final Office Action mailed Sep. 30, 2011, for U.S. Appl. No. 13/005,822, of McKelvey, J., et al., filed Jan. 13, 2011.
Notice of Allowance mailed Aug. 28, 2015, for U.S. Appl. No. 13/298,510, of Lamba, K. et al., filed Nov. 17, 2011.
Non-Final Office Action mailed Sep. 11, 2014, for U.S. Appl. No. 13/298,510, of Lamba, K. et al., filed Nov. 17, 2011.
Final Office Action mailed May 6, 2015, for U.S. Appl. No. 13/298,510, of Lamba, K. et al., filed Nov. 17, 2011.
Final Office Action mailed Jul. 9, 2012, for U.S. Appl. No. 13/005,822, of McKelvey, J., et al., filed Jan. 13, 2011.
Non-Final Office Action mailed Jun. 18, 2013, for U.S. Appl. No. 13/005,822, of McKelvey, J., et al., filed Jan. 13, 2011.
Non-Final Office Action mailed Dec. 10, 2013, for U.S. Appl. No. 13/005,822 of McKelvey, J., et al., filed Jan. 13, 2011.
Non-Final Office Action mailed Oct. 7, 2011, for U.S. Appl. No. 13/043,258, of McKelvey, J., filed Mar. 8, 2011.
Final Office Action mailed Jul. 13, 2012, for U.S. Appl. No. 13/043,258, of McKelvey, J., filed Mar. 8, 2011.
Non-Final Office Action mailed Dec. 11, 2013, for U.S. Appl. No. 13/043,258, of McKelvey, J., filed Mar. 8, 2011.
Notice of Allowance mailed Jul. 1, 2014, for U.S. Appl. No. 13/043,258, of McKelvey, J., filed Mar. 8, 2011.
Advisory Action mailed Aug. 15, 2012, for U.S. Appl. No. 13/043,258, of McKelvey, J., filed Mar. 8, 2011.
Advisory Action mailed Aug. 17, 2012, for U.S. Appl. No. 13/005,822, of McKelvey, J.,et al., filed Jan. 13, 2011.
Notice of Allowance mailed Jun. 24, 2014, for U.S. Appl. No. 13/005,822, of McKelvey, J., et al., filed Jan. 13, 2011.
Non-Final Office Action mailed Oct. 7, 2014, for U.S. Appl. No. 13/298,534, of Lamba, K., et al., filed Nov. 17, 2011.
Final Office Action mailed Apr. 8, 2015, for U.S. Appl. No. 13/298,534, of Lamba, K., et al., filed Nov. 17, 2011.
Final Office Action mailed Sep. 6, 2013, for U.S. Appl. No. 13/298,560, of Lamba K. et al., filed Nov. 17, 2011.
Advisory Action mailed Oct. 21, 2013, for U.S. Appl. No. 13/298,560 of Lamba K. et al., filed Nov. 17, 2011.
Final Office Action mailed Aug. 15, 2013, for U.S. Appl. No. 13/043,263, of McKelvey, J., filed Mar. 8, 2011.
Advisory Action mailed Nov. 8, 2013, for U.S. Appl. No. 13/043,263, of McKelvey, J., filed Mar. 8, 2011.
Non-Final Office Action mailed Feb. 24, 2014, for U.S. Appl. No. 13/043,263, of McKelvey, J., filed Mar. 8, 2011.
Notice of Allowance mailed Jul. 15, 2014, for U.S. Appl. No. 13/043,263, of McKelvey, J., filed Mar. 8, 2011.
Non-Final Office Action mailed Jul. 22, 2014, for U.S. Appl. No. 13/298,560, of Lamba K. et al., filed Nov. 17, 2011.
Final Office Action mailed Jan. 28, 2015, for U.S. Appl. No. 13/298,560, of Lamba K. et al., filed Nov. 17, 2011.
Non-Final Office Action mailed Oct. 11, 2011, for U.S. Appl. No. 13/043,203, of McKelvey. J., et al., filed Mar. 8, 2011.
Final Office Action mailed Jul. 6, 2012, for U.S. Appl. No. 13/043,203, of McKelvey. J., et al., filed Mar. 8, 2011.
Non-Final office Action mailed Oct. 11, 2011, for U.S. Appl. No. 13/043,263, of McKelvey, J., filed Mar. 8, 2011.
Advisory Action mailed Aug. 1, 2012, for U.S. Appl. No. 13/043,203, of McKelvey, J., filed Mar. 8, 2011.

(56) References Cited

OTHER PUBLICATIONS

Advisory Action mailed Aug. 16, 2012, for U.S. Appl. No. 13/043,263, of McKelvey, J., filed Mar. 8, 2011.
Non-Final Office Action mailed Apr. 29, 2013, for U.S. Appl. No. 13/043,263, of McKelvey, J., filed Mar. 8, 2011.
Non-Final office Action mailed Apr. 30, 2013, for U.S. Appl. No. 13/043,203, of McKelvey, J., filed Mar. 8, 2011.
Non-Final Office Action mailed May 28, 2013, for U.S. Appl. No. 13/298,560, of Lamba K. et al., filed Nov. 17, 2011.
Notice of Allowance mailed Jul. 9, 2013, for U.S. Appl. No. 13/043,203, of McKelvey, J., filed Mar. 8, 2011.
Non-Final Office Action mailed Jul. 6, 2015, for U.S. Appl. No. 13/298,534, of Lamba K. et al., filed Nov. 17, 2011.
Advisory Action mailed Apr. 9, 2015, for U.S. Appl. No. 13/298,560, of Lamba K. et al., filed Nov. 17, 2011.
Final office Action mailed Jul. 9, 2012, for U.S. Appl. No. 13/043,263, of McKelvey, J., filed Mar. 8, 2011.
Non-Final Office Action mailed Jul. 16, 2015, for U.S. Appl. No. 13/298,560, of Lamba K. et al., filed Nov. 17, 2011.
Application for Registration of an Industrial Design Examiner's Report for Canadian Design Application No. 159528, mailed Jun. 11, 2015.
English-language translation of Notice of Reasons for Rejection for Japanese Application No. 2014-0255525, mailed Mar. 31, 2015.
Certificate of Registration of Design for Indian Design Application No. 267386 mailed Nov. 14, 2014 (Registration No. 39149).
Non-Final Office Action mailed Jul. 27, 2015, for U.S. Appl. No. 29/493,212, of Edwards, T., et al., filed Jun. 6, 2014.
English-language translation of Decision of Final Rejection for Japanese Patent Application No. 2013-533897, mailed Feb. 23, 2015.
English-language translation of Office Action for Japanese Patent Application No. 2013-533897, mailed Jun. 5, 2014.
English-language translation of Search Report for Japanese Patent Application No. 2013-533897, mailed Apr. 14, 2014.
Certificate of Design Registration for European Patent Application No. 002578674, mailed Nov. 14, 2014 (Registration No. 002578674-0001).
Notice of Allowance mailed Sep. 2, 2015, for U.S. Appl. No. 14/578,107, of Wade, J. et al., filed Dec. 19, 2014.
Advisory Action mailed Sep. 11, 2015 for U.S. Appl. No. 13/298,506, of Lamba, K., et al., filed Nov. 17, 2011.
Notice of Allowance mailed Sep. 16, 2015 for U.S. Appl. No. 14/551,681, of Wade, J., et al., filed Nov. 24, 2014.
Notice of Allowance mailed Oct. 5, 2015 for U.S. Appl. No. 14/322,815, of Edwards, T., filed Jul. 2, 2014.
Notice of Allowance mailed Oct. 6, 2015 for U.S. Appl. No. 13/298,491, of Lamba, K., et al., filed Nov. 17, 2011.
Notice of Allowance mailed Oct. 7, 2015 for U.S. Appl. No. 13/298,510, of Lamba, K., et al., filed Nov. 17, 2011.
Notice of Allowance mailed Oct. 8, 2015 for U.S. Appl. No. 13/298,487, of Lamba, K., et al., filed Nov. 17, 2011.
Notice of Allowance mailed Oct. 13, 2015 for U.S. Appl. No. 14/578,107, of Wade, J., et al., filed Dec. 19, 2014.
Non-Final Office Action mailed Oct. 29, 2015 for U.S. Appl. No. 14/512,104, of Templeton, T., et al., filed Oct. 10, 2014.
English-language translation of Final Rejection for Japanese Application No. 2014-025525, mailed Oct. 20, 2015.
Notice of Allowance mailed Nov. 13, 2015, for U.S. Appl. No. 13/298,487, of Lamba, K., et al., filed Nov. 17, 2011.
Corrected Notice of Allowance mailed Nov. 18, 2015, for U.S. Appl. No. 14/578,107, of Wade, J., et al., filed Dec. 19, 2014.
Notice of Allowance mailed Nov. 19, 2015, for U.S. Appl. No. 13/298,491, of Lamba, K., et al., filed Nov. 17, 2011.
Corrected Notice of Allowance mailed Nov. 19, 2015, for U.S. Appl. No. 13/298,510, of Lamba, K., at al., filed Nov. 17, 2011.
Notice of Allowance mailed Nov. 20, 2015, for U.S. Appl. No. 13/298,501, of Babu, A., et al., filed Nov. 17, 2011.
Ex parte Quayle Action mailed Nov. 20, 2015, for U.S. Appl. No. 14/620,699, of Wade, J., et al., filed Feb. 12, 2015.
Notice of Allowance mailed Nov. 23, 2015, for U.S. Appl. No. 14/189,997, of Lamfalusi, M., et al., filed Feb. 25, 2014.
Non-Final Office Action mailed Dec. 14, 2015, for U.S. Appl. No. 13/298,506, of Lamba, K, et al., filed Nov. 17, 2011.
Notice of Allowance mailed Jan. 12, 2016, for U.S. Appl. No. 13/298,534, of Lamba, K, et al., filed Nov. 17, 2011.
Final Office Action mailed Jan. 15, 2016, for U.S. Appl. No. 29/493,212, of Edwards, T., et al., filed Jun. 6, 2014.
Extended European Search Report for European Patent Application No. 16155374.8, mailed Oct. 11, 2016.
Notice of Allowance mailed Sep. 22, 2016, for U.S. Appl. No. 13/298,506, of Lamba, K, et al., filed Nov. 17, 2011.
Notice of Allowance mailed Sep. 27, 2016, for U.S. Appl. No. 14/306,041, of Wade, J., et al., filed Jun. 16, 2014.
Notice of Allowance mailed Oct. 7, 2016, for U.S. Appl. No. 14/512,104, of Templeton, T., et al., filed Oct. 10, 2014.
Notice of Allowance mailed Oct. 26, 2016, for U.S. Appl. No. 15/013,937, of Lamba, K., et al., filed Feb. 2, 2016.
Corrected Notice of Allowance mailed Nov. 1, 2016, for U.S. Appl. No. 14/512,104, of Templeton, T., et al., filed Oct. 10, 2014.
Final Office Action mailed Nov. 3, 2016, for U.S. Appl. No. 13/298,560, of Lamba, K., et al., filed Nov. 17, 2011.
International Search Report and Written Opinion, for PCT Application No. PCT/US2015/045772, mailed Nov. 6, 2015.
Certificate of Design Registration for Japanese Design Application No. 2014-255525, mailed on Jun. 24, 2016 (Registration No. 1554745).
Notice of Acceptance for Australian Patent Application No. 2014362287, mailed on Jun. 30, 2016.
Office Action for Canadian Patent Application No. 2,932,849, mailed on Jul. 13, 2016.
Office Action for Brazilian Design Application No. 3020140057308, mailed on Jul. 26, 2016.
Non-Final Office Action mailed Jun. 30, 2016 for U.S. Appl. No. 15/066,496, of Babu, A., et al., filed Mar. 10, 2016.
Non-Final Office Action mailed Jul. 1, 2016, for U.S. Appl. No. 15/013,937, of Lamba, K., et al., filed Feb. 2, 2016.
Notice of Allowance mailed Jul. 14, 2016, for U.S. Appl. No. 14/942,515, of Lamba, K., et al., filed Nov. 16, 2015.
Non-Final Office Action mailed Aug. 17, 2016, for U.S. Appl. No. 14/985,624, of Wade, J., et al., filed Dec. 31, 2015.
Notice of Allowance mailed Aug. 26, 2016, for U.S. Appl. No. 131298,506, of Lamba, K., et al., filed Nov. 17, 2011.

* cited by examiner

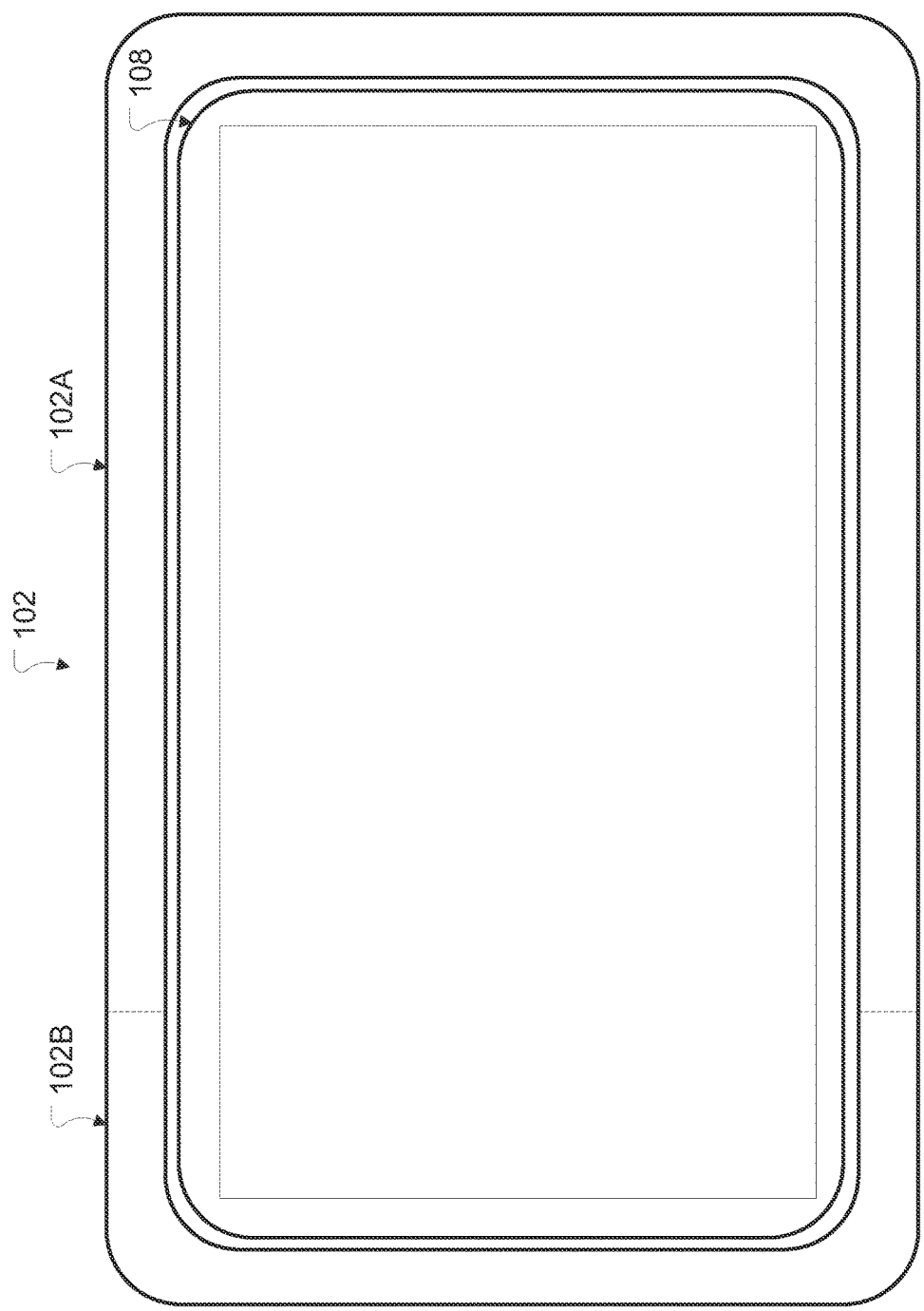

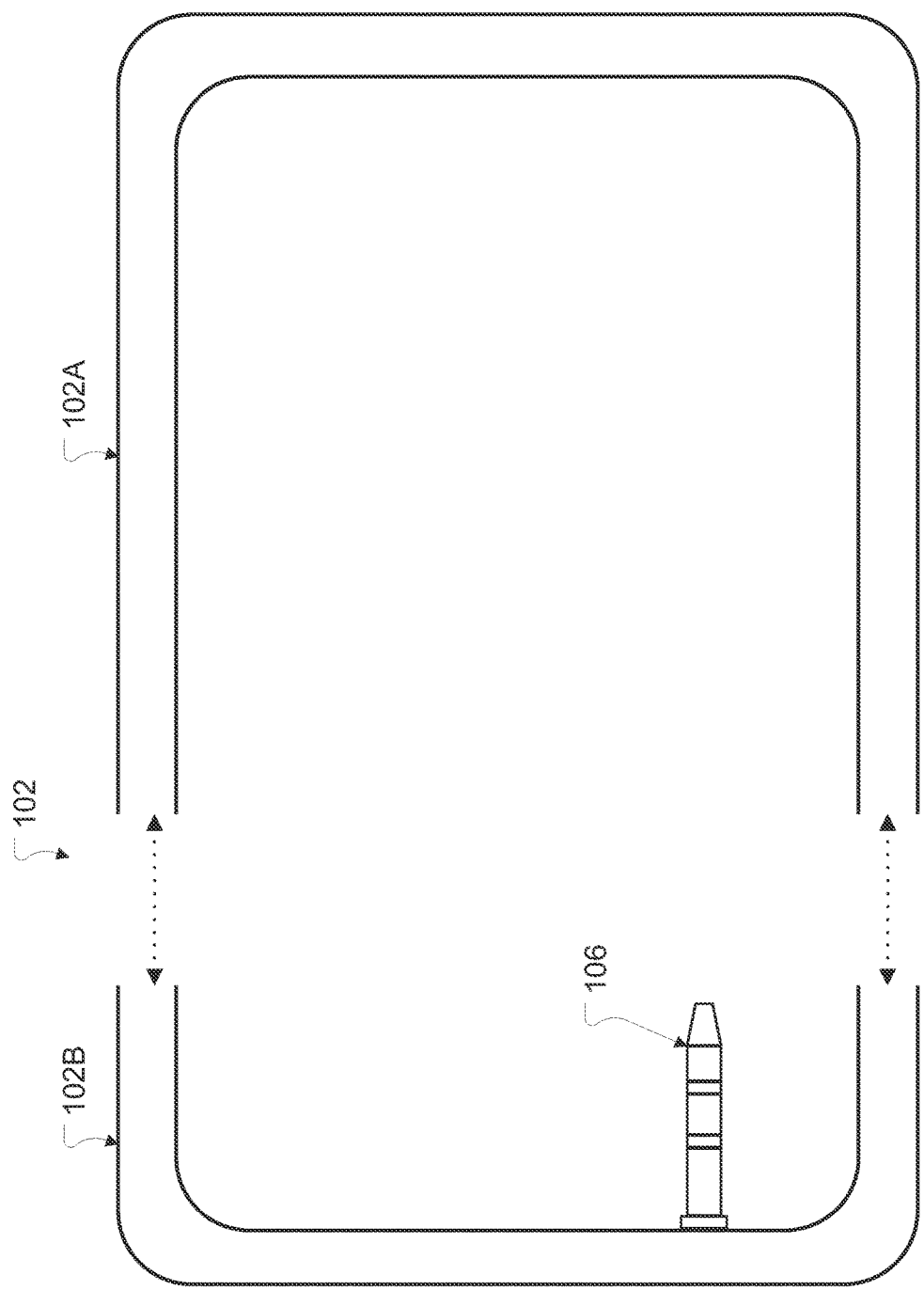

TERMINAL CASE WITH INTEGRATED DUAL READER STACK

BACKGROUND

1. Technical Field

The subject application relates to a case for a mobile point of sale (POS) terminal and in particular, to a case for a mobile device that includes multiple card reader devices configured for reading different payment card formats.

2. Introduction

The increasing prevalence of mobile computing devices, such as smart phones and tablet computers, has spurred an increase in popularity for protective carrying cases. While some cases provide mechanical functionality, such as protective or carrying features, most conventional cases do not provide hardware enhancements or offer expanded communication functionality.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

FIG. 1A illustrates an example of a front perspective view of a case of the subject technology, as used with a mobile computing device, according to some aspects.

FIG. 1C illustrates an example of a front perspective view of a case of the subject technology (without a mobile computing device), according to some implementations of the technology.

DETAILED DESCRIPTION

Figure 1B:
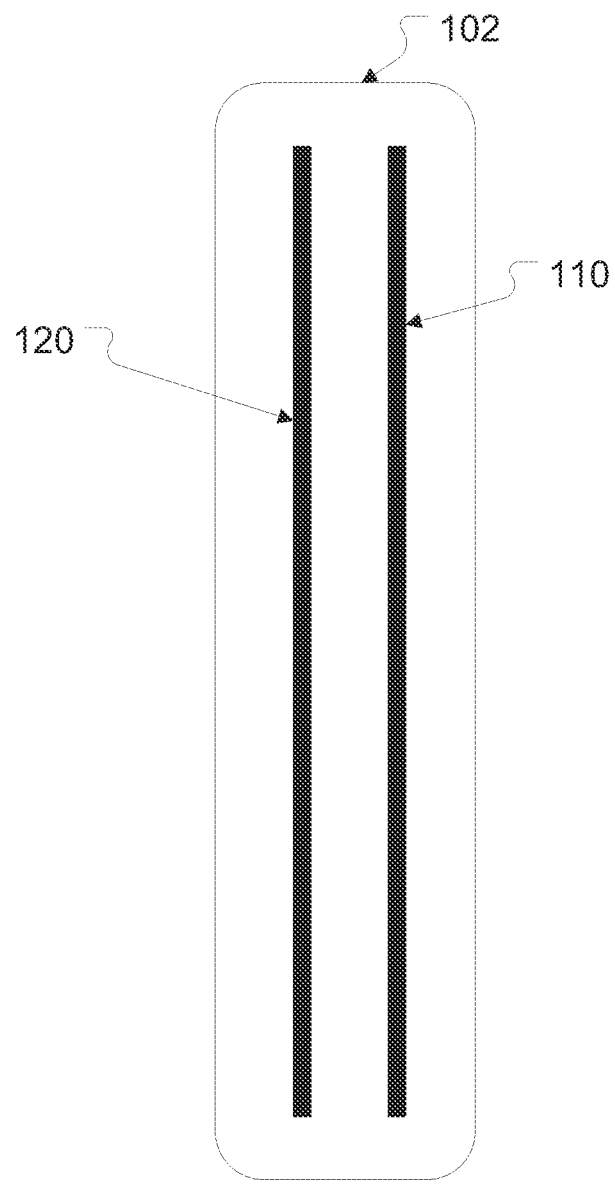
FIG. 1B illustrates an example of an end perspective view of a case which includes multiple slots for reading payment cards of different formats, according to some implementations of the technology.

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

The subject technology relates to a multi-purpose card reader device (e.g., a stacked card reader) configured to accept payment cards of different formats. Specifically, a stacked card reader of the subject technology provides multiple hardware modules configured for reading financial information from different payment card types, such as magnetic stripe payment cards and/or integrated circuit (IC) type payment cards. Financial information read by the stacked card reader is provided to a mobile host device, such as a mobile computer or tablet device, etc., for use in facilitating a financial transaction between a buyer and a seller.

A stacked card reader of the subject technology can be implemented either as an attachable peripheral device (e.g., that is attachable to a mobile host), or mechanically integrated into a case that is configured for cooperation around the mobile host. In aspects where the card reader is integrated within a case, the case can include different numbers of parts (or pieces) that fit around one or more edges of the enclosed mobile device. In some implementations, the case includes two portions, i.e., a "body" portion, and a "base" portion.

As discussed in further detail below, a case of the subject technology (which includes an integrated stacked card reader) can include a communication channel that provides an electrical coupling to the mobile device. For example, a communication channel coupled to the stacked card reader can be configured to provide signaling to the host device via a protruding plug or audio jack, such as a headphone jack. As such, the case, together with the integrated stacked card reader, can be used to expand functionality of the mobile device so that the unit can function as a versatile mobile point of sale (POS) terminal, capable of receiving payment cards of different formats, such as magnetic stripe payment cards and integrated circuit payment cards.

Physical integration of the card reader (e.g., card reader hardware and circuitry) in the case can vary depending on case design. In certain aspects, the card reader can be integrated into a base of the case that mechanically couples with a larger portion, e.g., a body portion, to retain/cover or surround edges of a tablet computer or smartphone device. In another implementation, the body portion and the base portion may be substantially similar in size, such that each individual portion comprises approximately half of the overall size of the case. Additionally, in yet another implementation, the case can include a single piece, e.g., one contiguous portion. In such implementations, and audio plug protruding inward from the case may be configured to permit the plug to swivel/rotate in a manner that allows the plug to connect with a corresponding headphone port of the mobile device inserted into the case. It is understood that in different implementations, the card reader can be differently disposed within the case; for example, the card reader can be placed in a larger (body) portion, whereas a smaller (base) portion may contain no reader hardware or circuitry.

In order to provide financial payment card information to the mobile host, the stacked card reader is coupled to a communication channel which can include a protruding segment configured for insertion into an audio port (headphone port) of the mobile host device. In certain aspects, the protruding segment of the connector is configured in a tip-ring-ring-sleeve (TRRS) configuration, for example, such as that of a 3.5 mm audio jack or plug that includes left and right audio channels, as well as a microphone channel. In certain aspects, a low-profile form factor for the case may be implemented, wherein the TRRS connector is connected to the stacked reader using a modified (shortened) base portion.

FIG. 1A illustrates an example of an implementation of an assembled case 102 of the subject technology which contains a mobile device 108. The assembled case 102 includes an integrated stacked card reader (not illustrated). As implemented in the example of FIG. 1A, assembled case 102 includes two separable portions: body portion (body) 102A, and a base portion (base) 102B.

The mechanical coupling of body 102A with base 102B forms assembled case 102, which surrounds mobile device 108. A stacked reader device contained within assembled case 102 can be electrically/communicatively coupled with mobile device 108 using a protruding plug (not illustrated), e.g., to facilitate the transfer of financial information from the stacked reader to the mobile device. Although different types of plugs/connectors may be used to facilitate information transfer between the stacked reader device and mobile device 108, it is understood that aspects of the subject technology is not restricted to a particular type of communication channel or bus. By way of example, a communication channel between mobile device 108 and reader circuitry contained within case 102 can be accomplished using any of: a Universal Serial Bus (USB), an audio channel (e.g., a 3.5 mm audio plug), FireWire, a High Performance Parallel Interface (HIPPI), a Lightening connector, or a dock connector (e.g., a 30-pin dock connector), etc.

FIG. 1B illustrates an example of an end perspective view of case 102 which first card slot 110 and second card slot 120 are depicted. It is understood that first card slot 110 and second card slot 120 are not limited to an end position on case 102 and can be placed on any portion of the case, depending on the desired implementation. For example, first card slot 110 and second card slot 120 can be disposed either on body 102A, or base 102B. Similarly, first card slot 110 and second card slot 120 can be provided in different orientations with respect to case 102, such as on a front side of case 102, so that the card slots face outward or upward relative to a direction of the mobile device screen.

First card slot 110 and second card slot 120 provide physical openings into which financial payment cards can be swiped (or inserted/dipped) for reading by stacked card reader circuitry in case 102. It is understood that various card reader circuitry implementations can be realized without departing from the scope of the technology. For example, first slot 110 can be configured to receive a magnetic stripe payment card and to facilitate reading of the magnetic stripe payment card by the integrated card reader. Similarly, second card slot 120 can be configured as a dip-slot and implemented to facilitate reading of an integrated circuit (IC) card by the reader circuitry, e.g., a financial payment card that conforms to the Europay MasterCard and Visa (EMV) global standard.

In operation, first card slot 110 and second card slot 120 are configured to receive payment cards of different format types such that each of the card slots facilitate the physical swiping/dipping of a financial payment card of a different type/format. When combined in the manner depicted by the example of FIG. 1B, a mobile device (such as a tablet computer or smart phone) may be used as a mobile POS terminal configured to accept different payment card formats.

In one example implementation, first card slot 110 is integrated with a magnetic stripe read module (e.g., first read circuitry), whereas second card slot 120 is integrated with an integrated circuit read module (e.g., second read circuitry). By having first card slot 110 and second card slot 120 disposed on case 102 in a parallel configuration, the respective first read circuitry and second read circuitry can be arranged to share common electrical components, e.g., in a stacked layout. For example, the first read circuitry and second read circuitry can be arranged in a PCB layout such that respective circuitry for reach read module is positioned on a different side of the PCB, e.g., in a "stacked" configuration. As a result, the card reader circuitry of the subject technology can be implemented with a smaller form factor, as compared to designs in which separate (unstacked) reader circuitry is used for reading cards of different formats/types.

It is understood that the use of card slots on case 102 can be differently configured, depending on implementation. For example, a single slot may be used, whereby different areas of the single slot correspond with receptacles for different card types. In such an implementation, a single (longer) slot may be used for receiving a magnetic stripe card, and a portion of the slot marked to indicate an area where the dip-slot is located. For example, an IC type payment card can be inserted into the same slot, in a direction perpendicular to that of the direction of the card swipe for a magnetic stripe payment card.

FIG. 1C illustrates an example of case 102 in which body 102A and base 102B are separated and wherein mobile device 108 is omitted. As illustrated in the example of FIG. 1C, case 102 includes protruding plug 106, which provides a communication channel between the stacked reader circuitry and a host computing device, e.g., mobile device 108 of FIG. 1A. Although plug 106 illustrated in the example of FIG. 1C is a 3.5 mm audio jack, it is understood that various types of communication devices/channels may be used to facilitate information exchange between the stacked reader circuitry and the host mobile device. By way of example, other wired communication buses may be used, such as a Universal Serial Bus (USB) type adaptor, 32-pin connector or Lightening connector, etc. In other embodiments, one or more wireless devices or radios (such as Bluetooth or Bluetooth low-energy devices) may be used to facilitate information exchange between the stacked reader circuitry and the mobile electronic device.

In operation, a communicative coupling is formed between the stacked reader circuitry of case 102 and the host mobile device when plug 106 is physical coupled with the host mobile device 108, for example, upon insertion of plug 106 into the host mobile device 108. As shown in this example, the complete fitting of case 102 onto host mobile device 108 includes the mechanical integration of base 102B with body 102A.

Figure 2:
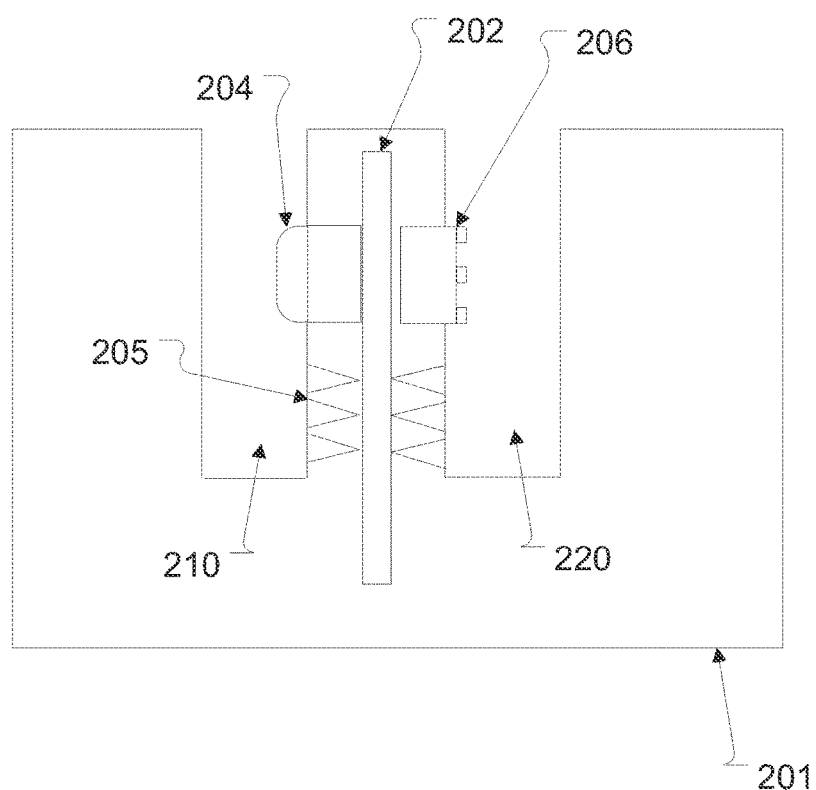
FIG. 2 depicts a side view of an example stacked card reader, according to some aspects of the technology.

FIG. 2 illustrates an example implementation of a stacked card reader 200, according to aspects of the subject technology. Specifically, FIG. 2 illustrates a side cut-away perspective view of stacked card reader 200, which is integrated into surrounding case 201, e.g., with first card slot 210 and second card slot 220. As illustrated, card reader 200 includes PCB/controller 202, magnetic stripe read module 204, displacement mechanism 205, and integrated circuit (IC) read module 206.

Although magnetic stripe read module 204 and IC read module 206 can be differently configured depending on implementation; in the illustrated example, magnetic stripe read module 204 represents a magnetic element, such as a magnetic read head, configured for producing a time-varying voltage signal upon the proximate passage of a magnetic stripe (e.g., of a magnetic stripe payment card). Similarly, IC read module 206 is configured to use a contact element such as projections or a read-pad etc., for forming electrical contact with an embedded chip (integrated circuit) of a payment card, such as that conforming to the Europay MasterCard and Visa (EMV) global standard, as discussed above.

In some embodiments the first card slot, stacked reader circuitry, and the second card slot are aligned in the same geometric plane such that a cross section of a portion of the device would expose portions of the first card slot the stacked reader circuitry, and the second card slot. In some embodiments, the magnetic element for reading a magnetic strip of a payment card and the contact element for reading the IC card can also be located in substantially the same geometric plane.

Additionally, in the illustrated example, PCB/controller 202 represents a printed circuit board (PCB) with an integrated controller (e.g., microprocessor) for use in controlling operation of magnetic stripe read module 204 and IC read module 206. In certain aspects, PCB/controller 202 is coupled to a smart phone (not illustrated), for example via an audio channel, such as audio plug 106, discussed above.

Although magnetic stripe read module 204 and IC read module 206 are illustrated as 'stacked' around PCB/controller 202, it is understood that functionality provided by PCB/controller 202 can be provided in other hardware modules residing separate from magnetic stripe read module 204 and IC read module 206. That is, PCB/controller 202 is not necessary for certain implementations of the technology that implement a stacked configuration of magnetic stripe read module 204 and IC read module 206. For example, magnetic stripe read module 204 and IC read module 206 can be similarly stacked around an electronically functionless (i.e., dumb) tray or other electronically functionless mount, without departing from the scope of the subject technology.

By way of further example, a controller (or other electronic functionality of PCB/controller 202) can be provided by hardware modules residing in other portions of card reader 200, such as in surrounding case 201. In some aspects, such hardware modules are connected to magnetic stripe read module 204 and/or IC read module 206, for example, via a control bus or using a flex cable.

In some implementations, PCB/controller 202 is configured such that magnetic stripe read module 204 and IC read module 206 can be coupled (both electrically and physically) to opposite sides of PCB 202, e.g., a first surface and a second surface. In this configuration, magnetic stripe read module 204 and IC read module 206 are "stacked" for example, to enable integration with corresponding first card slot 210 and second card slot 220. The configuration of PCB 202 and the read modules (204, 206) facilitates the sharing of electrical componentry (e.g., use of controllers and/or microprocessors), in stacked card reader 200. As a result, stacked card reader 200 can be implemented using a smaller form factor than would be possible should the respective read modules (204, 206) be implemented using separate PCBs and/or controllers.

It is understood that other read module configurations can be implemented with PCB 202. For example, stacked reader circuitry on PCB 202 can be configured such that it is mechanically loaded (e.g., spring loaded) using displacement mechanism 205, such that insertion of a payment card, in either first card slot 210 or second card slot 220, causes a physical bias of the PCB assembly in an opposite direction away from its neutral position, thereby permitting insertion of a payment card in a respective card slot. By way of example, an IC payment card inserted into second card slot 220 causes physical displacement of PCB 202 (e.g., in a direction of first card slot 210) away from its neutral position, such that simultaneous insertion of a different payment card into first card slot 210 is inhibited. When a payment card is removed the stacked reader circuitry can return to its neutral position.

In another aspect, read modules 204, 206 can be coupled to the same side of PCB 202, such as the first surface (or the second surface) of PCB 202. In such implementations, a magnetic read head of magnetic stripe read module 205 can be configured to pass through PCB 202, upon displacement of the read head caused by the passage of a magnetic stripe payment card. In such configurations, a size of stacked card reader 200 can be further reduced, for example, by at least the thickness of PCB 202, due to the fact that the read head of magnetic stripe read module 206 can pass through PCB 202.

A reduced form factor of the card reader, due to the 'stacked' configuration of read modules (204, 206) can improve security of the device, for example, by reducing an amount of room around the reader circuitry that may be used to tamper with the device. Additionally, in some aspects, PCB 202 can be constructed of stacked copper layers including one or more anti-tamper mesh portions (e.g., disposed on an outer layer of PCB 202), to prevent malicious interference with PCB 202, for example, by drilling down into the PCB to attach additional wires.

In practice, read modules (204, 206) and PCB 202 can be configured such that the entire assembly shifts upon insertion of a financial payment card into either first card slot 210, or second card slot 220. For example, a magnetic stripe payment card inserted into first card slot 210 causes PCB 202 (and consequently IC read module 206) to be biased (to the right) to permit passage of the payment card past magnetic stripe read module 204. The configuration of the surrounding case provides support for movement of the assembly. In some configurations in which read modules 204 and 206 are movable, the form factor of the entire stacked card reader 200 assembly may be further reduced in size, for example, to permit the insertion/swiping of one payment card at a time.

Figure 3:
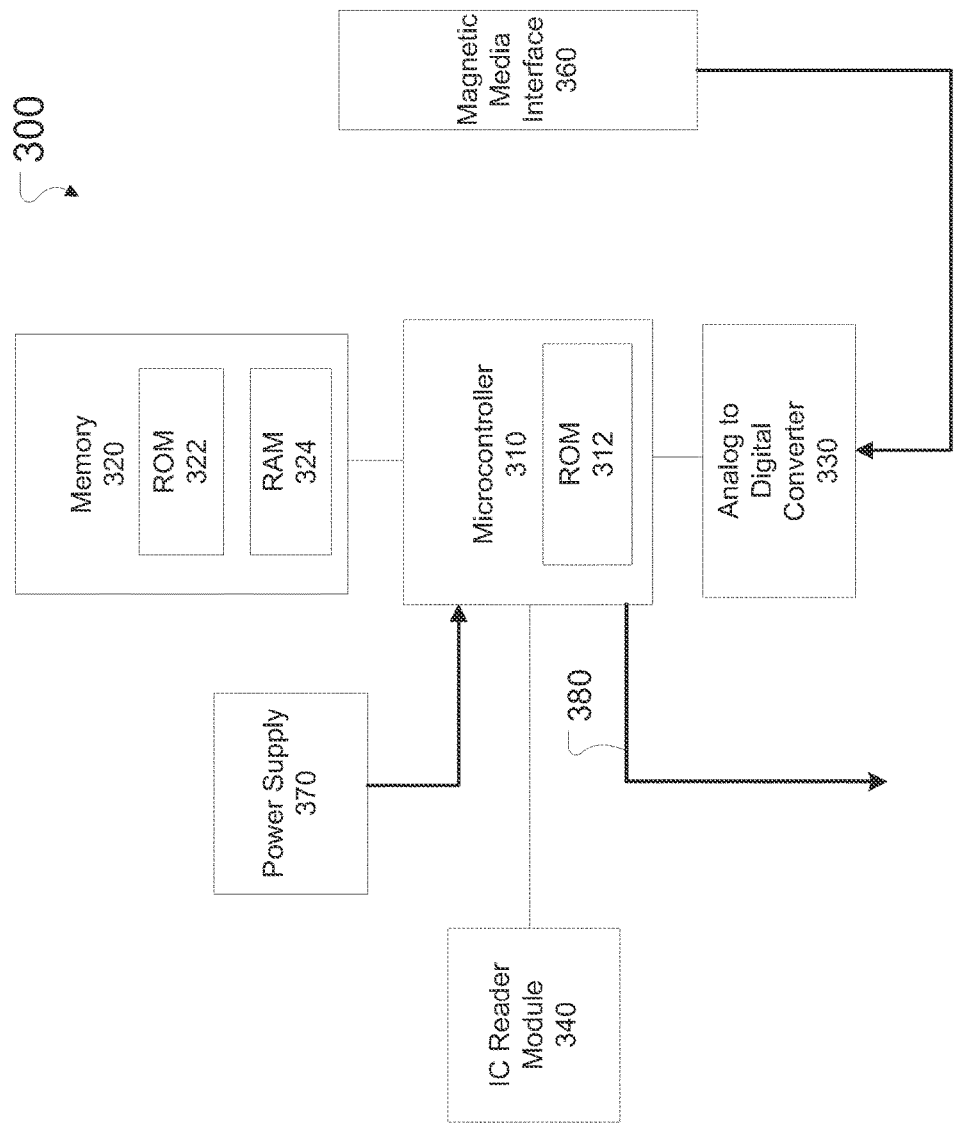
FIG. 3 conceptually illustrates an example configuration of hardware modules for implementing a stacked card reader, according to some aspects of the subject technology.

FIG. 3 depicts an example block diagram of hardware components used to implement a stacked card reader 300 of the subject technology. Stacked card reader 300 includes microcontroller 310, memory 320, analog-to-digital converter (ADC) 330, IC read module 340, media interface 360, and power supply 370.

As illustrated, microcontroller 310 is coupled to memory 320, and ADC 330. Additionally, microcontroller 310 is coupled to IC read module 340, as well as media interface 360, either via ADC 330. Additionally, microcontroller 310 is coupled to communication channel 380, which, as described above, can further include a plug (e.g., plug 106) for use in providing a communicative link between microcontroller 310 and a host mobile device (not illustrated). In some implementations, communication channel 380 can be configured to provide electrical/communicative contact with a protruding plug (e.g., plug 106), such as a TRRS connector, for example, that is configured for insertion into the headphone port of a mobile computing device.

In some implementations, power supply 370 is a battery configured for delivering power to microcontroller 310. However, power supply 370 is not limited to a current storage device. For example, power supply 370 can include a power interface e.g., to an external power supply or power source. By way of example, power supply 370 can provide a coupling to a microphone-line (e.g., of a 3.5 mm TRRS plug) for drawing current from an active device, such as an in-line microphone.

It is understood that stacked reader device 300 can be implemented using various other hardware components and/or configurations, and is not limited to the architecture depicted in FIG. 3. By way of example, microcontroller 310 can be implemented using a general-purpose processor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

Memory 320 can include various types of memories, including working memory in the form of random-access memory (RAM) 324 and read-only memory (ROM) 322. Additionally, various types of memory can be utilized in place of, or in addition to, memory 320. For example, the one or more sequences of instructions for operating stacked reader device 300 can be stored as software or firmware in a ROM 322 within microcontroller 310 or in the ROM 322 within memory 320. One or more sequences of instructions can also be software stored and read from another storage medium, such as the flash memory array, or received from the host computing device (e.g., a mobile device such as a smart phone or tablet computing device) via a host interface. ROM, storage mediums, and flash memory arrays represent examples of machine or computer readable media storing instructions/code executable by microcontroller 310. Machine or computer readable media may generally refer to any medium or media used to provide instructions to microcontroller 310, including both volatile media, such as dynamic memory used for storage media or for buffers within microcontroller 310, and non-volatile media, such as electronic media, optical media, and magnetic media.

Magnetic media interface 360 can form a device, or portion thereof, for reading media located on credit cards, debit cards, or objects to obtain payment information. In some implementations, magnetic media interface 360 can be configured to read information from a physical storage medium, such as magnetic storage media (e.g., magnetic stripe media). However, in other implementations, magnetic media interface may be configured for reading other types of electrical or magnetic media.

Similarly, IC read module can be configured for reading integrated circuits, and in particular, embedded circuitry used with financial payment cards, such as IC payment cards.

Figure 4:
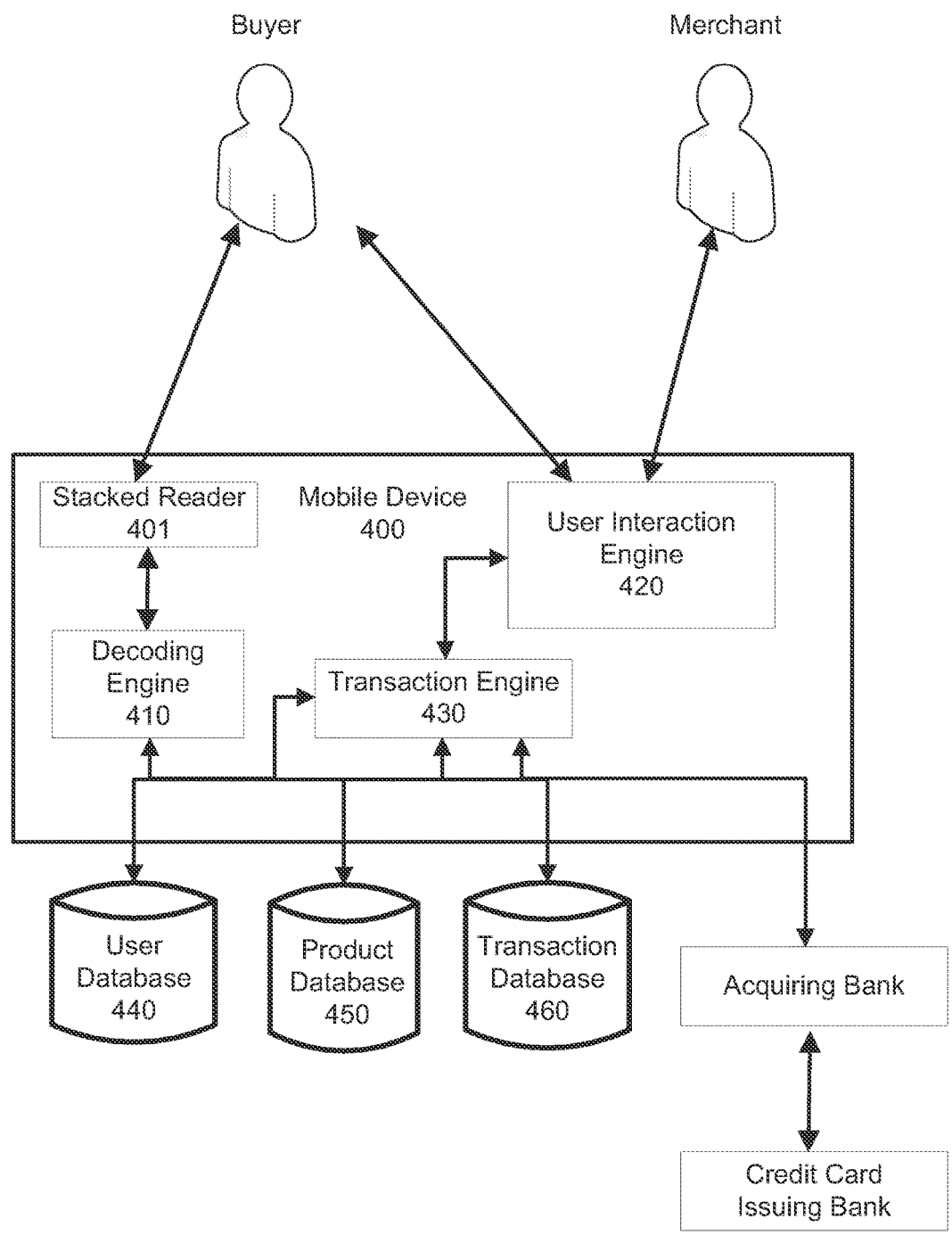
FIG. 4 conceptually illustrates an example environment in which a case containing a stacked card reader can be used to facilitate a financial transaction between a buyer and a merchant.

FIG. 4 illustrates an example environment in which a case and card reader may be used. It will be apparent that the components portrayed in FIG. 4 can be arbitrarily combined or divided into separate software, firmware and/or hardware components. Furthermore, it will also be apparent that such components, regardless of how they are combined or divided, can execute on the same host or multiple hosts, and wherein multiple hosts can be connected by one or more networks.

In the example of FIG. 4, the system includes a mobile device 400, a stacked reader 401 connected to mobile device 400, a decoding engine 410, a user interaction engine 420, and a transaction engine 430, all running on mobile device 400. Additionally, the system may also include one or more of a user database 440, a product or service database 450, and a transaction database 460, all coupled to the transaction engine 430.

Consistent with aspects of the subject technology, stacked reader 401 can be physically integrated into a case, such as that discussed above with respect to FIGS. 1A-C, which contains or surrounds mobile device 400.

As used herein, the term engine can refer to software, firmware, hardware, and/or other components used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically involves the execution of drivers. The drivers may or may not be considered part of the engine, but the distinction is not critical.

As used herein, the term database is used broadly to include any known or convenient means for storing data, whether centralized or distributed, relational or otherwise.

In the example of FIG. 4, mobile device 400 to which stacked reader 401 is connected can be, but is not limited to, a cell phone, such as Apple's iPhone, other portable electronic devices, such as Apple's iPod Touches, Apple's iPads, and mobile devices based on Google's Android operating system and any other portable electronic device that includes software, firmware, hardware, or any combination capable of at least receiving the signal, decoding if needed, exchanging information with a transaction server to verify the buyer and/or seller's account information, conducting the transaction, and generating a receipt. Typical components of mobile device 400 can include but are not limited to persistent memories like flash ROM, random access memory like SRAM, a camera, a battery, LCD driver, a display, a cellular antenna, a speaker, a Bluetooth circuit, and WiFi circuitry, where the persistent memory may contain programs, applications, and/or an operating system for the mobile device.

In some implementations, a system is provided with transaction engine 430 running on mobile device 400. In response to a financial transaction between a buyer and a seller, mobile device 400 accepts information selected including but not limited to information from financial transaction or information pertaining to financial transaction card used by the buyer in the transaction. Additionally, a financial transaction device can be utilized, Non-limiting examples of financial transaction devices include but are not limited to a, wristband, RFID chip, cell phone, biometric marker and the like. At least a portion of this information is communicated with a third party financial institution or payment network to authorize the transaction.

Payment confirmation can be made with a communication channel of the buyer's choice. As non-limiting examples, confirmation of payment can be an electronic notification in the form selected from at least one of, email, SMS message, tweet (message delivered via Twitter), instant message, communication within a social network and the like. In response to the transaction, a confirmation is made that the buyer is authorized to use the financial transaction card. In certain implementations, a confirmation can be provided that indicates a sufficiency of funds available to the buyer.

In the example of FIG. 4, stacked reader 401 is configured to read data encoded in either a magnetic strip (or IC) of a card being swiped by a buyer and send a signal that corresponds to the data read to mobile device 400. However, as discussed above, stacked reader 401 is configured to receive various payment card types, including but not limited to IC cards that can be provided to reader 401 using a dip-slot.

The size of reader 401 can be miniaturized to be portable for connection with mobile device 400. For example, the size of stacked card reader 401 can be miniaturized to an overall length of less than 1.5". In addition, the miniaturized stacked card reader 401 is also designed to reliably read the card with minimum error via a single swipe by counteracting vendor specific filtering done by mobile device 400. Note that this broad overview is meant to be non-limiting as components to this process are represented in different embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, read-only and recordable Blu-Ray® discs, ultra density optical discs, any other optical or magnetic media. The computer-readable media can store a computer program that is executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A mobile point-of-sale (POS) terminal for processing a financial transaction between a buyer and a merchant, the POS terminal comprising:
   a register application configured to be executed by a mobile computing device, wherein the register application is configured to receive payment information from the buyer via the mobile computing device, thereby facilitating a transfer of funds from the buyer to the merchant; and
   a case mechanically coupled to the mobile computing device, wherein the case comprises:
      a first card slot of a plurality of card slots, the first card slot having a magnetic read head disposed within, the first card slot being configured to receive a magnetic stripe payment card from the buyer and to thereby facilitate the magnetic read head reading financial information associated with the buyer from a magnetic stripe of the magnetic stripe payment card, thereby facilitating a transfer of funds from the buyer to the merchant using the register application,
      a second card slot of the plurality of card slots, wherein an interior planar surface of the second card slot is disposed parallel to an interior planar surface of the first card slot, the second card slot having projections for contacting an integrated circuit (IC) disposed therein, the second card slot configured receive an IC payment card from the buyer and to thereby facilitate the projections reading financial information associated with the buyer from the IC of the IC payment card, thereby facilitating a transfer of funds from the buyer to the merchant using the register application,
      stacked reader circuitry disposed within the case, the stacked reader circuitry comprising first read circuitry and second read circuitry both disposed on a single printed circuit board (PCB), the first read circuitry is mechanically integrated with the magnetic read head and the second read circuitry is mechanically integrated with the projections for contacting the IC of the IC payment card, and
      a displacement mechanism configured to allow temporary physical displacement of at least a portion of the stacked reader circuitry upon receipt of a first card into one of the plurality of card slots.

2. The mobile POS terminal of claim 1, wherein the single PCB comprises a first surface and a second surface, and
   wherein the first read circuitry is electrically coupled to the PCB on the first surface, and
   wherein the second read circuitry is electrically coupled to the PCB on the second surface.

3. The mobile POS terminal of claim 2, wherein the stacked reader circuitry is configured to be communicatively coupled to a mobile electronic device.

4. The mobile POS terminal of claim 2, further comprising a power storage unit, and wherein the power storage unit is configured to supply power to the stacked reader circuitry.

5. The mobile POS terminal of claim 2, wherein the stacked reader circuitry is communicatively coupled to a communication channel, and wherein the communication channel is configured to facilitate a transfer of financial information to a mobile electronic device.

6. The mobile POS terminal of claim 2, wherein the read circuitry is configured to receive power from a mobile electronic device.

7. The mobile POS terminal of claim 1, wherein the stacked reader circuitry further comprises a displacement mechanism, whereby when a card is inserted into either the first card slot or the second card slot, a portion of the stacked reader circuitry can be displaced from a neutral position to accommodate the payment card, and can return to the neutral position when the payment card is removed.

8. The mobile POS terminal of claim 1, wherein the first card slot, stacked reader circuitry, and the second card slot are all aligned in substantially a same plane, such that a cross section of the device would expose a portion of the first card slot, stacked reader circuitry, and the second card slot.

9. The mobile POS terminal of claim 1, wherein the printed circuit board is disposed parallel to the interior planar surface of the first card slot and to the interior planar surface of the second card slot.

10. The mobile POS terminal of claim 1, wherein the case is separably mechanically coupled to the mobile computing device.

11. A case comprising:
a first card slot of a plurality of card slots, the first card slot configured for receiving a magnetic stripe payment card;
a second card slot of the plurality of card slots, wherein an interior planar surface of the second card slot is disposed parallel to an interior planar surface of the first card slot, the second card slot configured for receiving an integrated circuit (IC) payment card;
stacked reader circuitry disposed within the case, the stacked reader circuitry comprising first read circuitry and second read circuitry both disposed on a printed circuit board (PCB), wherein the first read circuitry is mechanically integrated with the first card slot and configured to read financial information from a magnetic stripe of the magnetic stripe payment card upon passage of the magnetic stripe payment card through the first card slot, and wherein the second read circuitry is mechanically integrated with the second card slot and configured to read financial information from an integrated circuit (IC) of the IC payment card upon receipt of the IC payment card into the second card slot; and
a displacement mechanism configured to allow temporary physical displacement of at least a portion of the stacked reader circuitry upon receipt of a first card into one of the plurality of card slots.

12. The case of claim 11, wherein the interior planar surface of the first card slot and the interior planar surface of the second card slot are both disposed parallel to the printed circuit board (PCB).

13. The case of claim 11, wherein the PCB comprises a first surface and a second surface, and wherein the first read circuitry is electrically coupled to the PCB on the first surface, and the second read circuitry is electrically coupled to the PCB on the second surface.

14. The case of claim 11, wherein the PCB comprises a first surface and a second surface, and wherein the first read circuitry and the second read circuitry are each coupled to the PCB on the first surface.

15. The case of claim 11, wherein the stacked reader circuitry is configured to be communicatively coupled to a mobile electronic device.

16. The case of claim 11, further comprising a power storage unit, and wherein the power storage unit is configured to supply power to the stacked reader circuitry.

17. The case of claim 11, wherein the stacked reader circuitry is electrically coupled to a communication channel, and wherein the communication channel is configured to facilitate financial information transfer to a mobile electronic device.

18. The case of claim 11, further comprising a coupling mechanism configured to separably mechanically couple the case to a mobile computing device.

19. A card reader comprising:
a first card slot of a plurality of card slots, the first card slot configured for receiving a magnetic stripe payment card;
a second card slot of the plurality of card slots, wherein an interior planar surface of the second card slot is disposed parallel to an interior planar surface of the first card slot, the second card slot configured for receiving an integrated circuit (IC) payment card;
stacked reader circuitry comprising first read circuitry and second read circuitry, wherein the first read circuitry is mechanically integrated with the first card slot and configured to read financial information from a magnetic stripe of the magnetic stripe payment card upon passage of the magnetic stripe payment card through the first card slot, and wherein the second read circuitry is mechanically integrated with the second card slot and configured to read financial information from an integrated circuit (IC) of the IC payment card upon receipt of the IC payment card into the second card slot; and
a displacement mechanism configured to allow temporary physical displacement of at least a portion of the stacked reader circuitry upon receipt of a first card into one of the plurality of card slots.

20. The card reader of claim 19, wherein the interior planar surface of the first card slot and the interior planar surface of the second card slot are both disposed parallel to a printed circuit board (PCB), wherein the first read circuitry and second read circuitry are electrically coupled to the PCB.

21. The card reader of claim 19, wherein the stacked reader circuitry comprises a printed circuit board (PCB), and wherein the PCB comprises a first surface and a second surface, and wherein the first read circuitry is electrically coupled to the PCB on the first surface, and the second read circuitry is electrically coupled to the PCB on the second surface.

22. The card reader of claim 19, wherein the stacked reader circuitry is configured to be communicatively coupled to a mobile electronic device.

23. The card reader of claim 19, further comprising a power storage unit, and wherein the power storage unit is configured to supply power to the stacked reader circuitry.

* * * * *